UNITED STATES PATENT OFFICE 2,155,447

POLYMETHINE DYESTUFFS AND A PROCESS OF MAKING SAME

Nikolaus Roh, Ludwigshafen-on-the-Rhine, and Paul Wolff and Gustav Schäfer, Frankfort-on-the-Main-Hochst, Germany, assignors to General Aniline Works, Inc., New York, N. Y., a corporation of Delaware No Drawing. Application July 25, 1936, Serial No. 92,684. In Germany August 16, 1935

7 Claims. (Cl. 260—240)

The present invention relates to polymethine dyestuffs and a process of producing same.

We have found that valuable dyestuffs of the polymethine series are obtained by causing N-acyl compounds of heterocyclic nitrogen compounds which are hydrogenated in the ring containing nitrogen and contain therein a secondary nitrogen atom to react in about equimolecular proportions in the presence of a condensing agent containing halogen, such as for example phosphorus oxychloride or phosgene, with indolines which have a reactive methylene group in alpha-position to the nitrogen atom.

By splitting the dyestuffs which are derived from formyl compounds of heterocyclic nitrogen compounds with alkalies there are formed indoline aldehydes and the free heterocyclic nitrogen compounds which have been used as formyl derivatives for the synthesis. Consequently the new dyestuffs have the constitution III and are formed according to the equation:

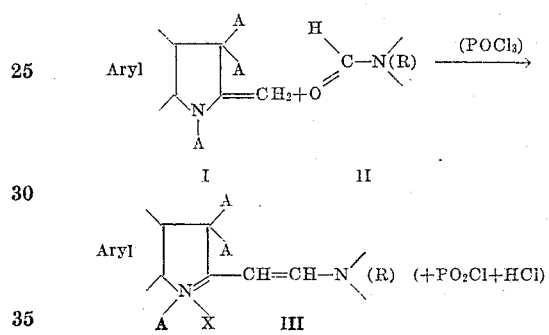

wherein the A's are alkyl groups, X is halogen and R is the heterocyclic radicle including the secondary nitrogen atom.

The reaction is preferably carried out in a solvent such as benzene, ortho-dichlorbenzene or chloroform, in the cold. Acyl compounds of the said kind suitable as initial materials are for example tetrahydroquinoline, dihydro-alpha-methylindole, dihydro-alpha-phenylindole, 2,2,3,3-tetramethylindoline and hexahydrocarbazole which are substituted in the nitrogen atom by the radicle of a monocarboxylic acid, as for example formic acid, acetic acid, propionic acid or benzoic acid. These compounds may be readily obtained by heating the bases for several hours with the corresponding acids, acid anhydrides or acid chlorides and subsequent distillation.

The new dyestuffs are distinguished by excellent clarity and very good fastness to light of the dyeings.

The following examples will further illustrate how the present invention is carried out in practice but the invention is not restricted to these examples. The parts are by weight.

Example 1

32 parts of phosphorus oxychloride are added at a temperature below 10° C. to a solution of 33 parts of formyldihydro-alpha-methylindole in 45 parts of benzene. Into this mixture 34 parts of 1,3,3-trimethyl-2-methyleneindoline are then allowed to flow at from 0° to 5° C. After stirring for about five hours at below 10° C. and allowing to stand for several hours at ordinary temperature, the mass is poured onto a mixture of 200 parts of ice and 100 parts of water and stirred until the phosphorus oxychloride has been destroyed and the mass has become crystalline. The benzene is then removed by means of steam, the dyestuff solution freed if necessary from resinous constituents by the addition of a little animal carbon and filtration, the dyestuff which separates in a good yield in the cold is filtered off by suction and dried. It forms yellow crystals and dyes cotton mordanted with tannic acid clear greenish yellow shades of good fastness to light. When treating the dyestuff with aqueous caustic soda solution it is split up with the formation of 1,3,3-trimethyl-2-methylene indoline-omega-aldehyde and dihydro-alpha-methylindoline. Accordingly the dyestuff most probably corresponds to the formula

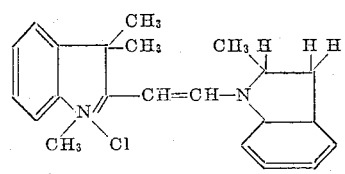

If 41 parts of 1,3,3-trimethyl-5-methoxy-2-methylene-indoline be employed instead of 1,3,3-trimethyl-2-methylene-indoline, a similar dyestuff is obtained.

Example 2

32 parts of phosphorus oxychloride are added at below 10° C. to a solution of 35 parts of formyl-tetrahydroquinoline in 45 parts of benzene, 34 parts of 1,3,3-trimethyl-2-methyleneindoline then being allowed to drop into the solution at from 0° to 5° C. By working up in the manner described in Example 1, yellow crystals are obtained which yield clear green-yellow dyeings on cotton mordanted with tannic acid.

A similar dyestuff is obtained by employing 41 parts of 1,3,3-trimethyl-5-methoxy-2-methylene-indoline instead of 1,3,3-trimethyl-2-methylene-indoline. When treating this dyestuff with aqueous caustic soda solution it is split up with the formation of 1,3,3-trimethyl-5-methoxy-2-methylene indoline-omega-aldehyde and tetrahydro-quinoline. Accordingly the dyestuff most probably corresponds to the formula

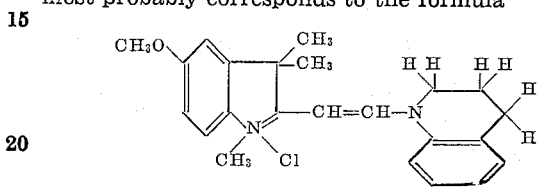

Example 3

32 parts of phosphorus oxychloride are added at below 10° C. to a solution of 36 parts of formyl-hexahydrocarbazole in 45 parts of benzene. 34 parts of 1,3,3-trimethyl-2-methylene-indoline are then allowed to drop in at from 0° to 5° C., the mass stirred for three hours at below 10° C., allowed to stand for several hours and then poured onto a mixture of 200 parts of ice and 100 parts of water. After stirring thoroughly, the benzene is removed by means of steam and after filtration the dyestuff solution is allowed to stand for the purpose of crystallization. The dyestuff obtained in the form of yellow crystals dyes cotton mordanted with tannic acid clear yellow shades.

Example 4

21 parts of phosgene are led into a solution of 33 parts of formyl-dihydro-methylindole in 45 parts of benzene while cooling; 41 parts of 5-methoxy-1,3,3-trimethyl-2-methylene-indoline are then allowed to flow slowly into the mixture at from 0° to 10° C. The mixture is stirred for a time at ordinary temperature, reaction taking place with the evolution of carbon dioxide. After allowing to stand for several hours, the mixture is introduced into about 500 parts of water and the benzene is removed by means of steam. After filtering and cooling, the new dyestuff crystallizes out. By recrystallization from water it may be purified. It dyes cotton mordanted with tannic acid clear yellow shades.

Example 5

30 parts of phosphorus oxychloride are stirred while cooling into a mixture of 35 parts of acetyl-dihydro-2-methylindole, 35 parts of 1,3,3-trimethyl-2-methylene-indoline and 30 parts of zinc chloride. When the reaction is completed, the whole is taken up in water and the dyestuff formed is salted out. It dyes cotton mordanted with tannic acid brilliant yellow shades of very good fastness to light. The dyestuff most probably corresponds to the formula

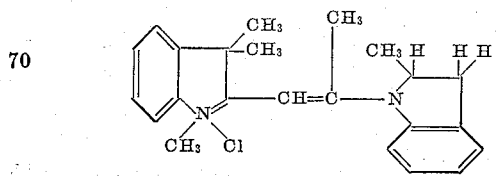

Example 6

15 parts of phosphorus oxychloride are stirred while cooling into a mixture of 17 parts of acetyl-tetrahydroquinoline, 17 parts of 1,3,3-trimethyl-2-methylene-indoline and 15 parts of zinc chloride. When the reaction is completed, the whole is taken up in water and the dyestuff salted out. The dyestuff has properties similar to those of the dyestuff in Example 5.

Example 7

15 parts of phosphorus oxychloride are added while cooling to a mixture of 19 parts of propionyl-dihydro-2-methylindole, 17 parts of 1,3,3-trimethyl-2-methylene-indoline and 15 parts of zinc chloride. When the formation of dyestuff is completed, it is worked up in the usual manner. In its properties, the dyestuff resembles those obtainable according to Examples 5 and 6.

What we claim is:

1. A process of producing dyestuffs of the polymethine series which consists in causing a N-acyl compound of a hydrogenated heterocyclic compound selected from the group consisting of indolines, tetrahydroquinolines and hexahydrocarbazoles in which compound said acyl radical is an acyl radical of a low molecular saturated aliphatic monocarboxylic acid to react in about equimolecular proportions in the presence of a condensing agent containing halogen with a 1,3,3-trialkyl-2-methylene indoline.

2. Dyestuffs of the polymethine series corresponding to the general formula

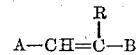

wherein A stands for the radicle of a 1,3,3-trimethylindoline attached to the methine group shown in alpha-position to its nitrogen atom, and wherein R stands for a member of the group consisting of hydrogen, and methyl and ethyl radicles, and wherein B stands for the radicle of a hydrogenated heterocyclic compound selected from the group consisting of indolines, tetrahydroquinolines, and hexahydrocarbazoles, attached to the

shown by means of the heterocyclic nitrogen atom, which dyestuffs are soluble in water giving yellow colorations, which form in the dry state orange to yellow crystals, and which dye cotton mordanted with tannic acid yellow shades.

3. Dyestuffs of the polymethine series corresponding to the general formula A—CH=CH—B wherein A stands for the radicle of a 1,3,3-trimethylindoline attached to the methine group shown in alpha-position to its nitrogen atom, and wherein B stands for the radicle of a hydrogenated heterocyclic compound selected from the group consisting of indolines, tetrahydroquinolines, and hexahydrocarbazoles, attached to the methine group shown by means of the heterocyclic nitrogen atom, which dyestuffs are soluble in water giving yellow colorations, which form in the dry state orange to yellow crystals, and which dye cotton mordanted with tannic acid yellow shades.

4. Dyestuffs of the polymethine series corresponding to the general formula

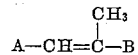

wherein A stands for the radicle of a 1,3,3-trimethylindoline attached to the methine group shown in alpha-position to its nitrogen atom, and wherein B stands for the radicle of a hydrogenated heterocyclic compound selected from the group consisting of indolines, tetrahydroquinolines, and hexahydrocarbazoles, attached to the

shown by means of the heterocyclic nitrogen atom, which dyestuffs are soluble in water giving yellow colorations, which form in the dry state orange to yellow crystals, and which dye cotton mordanted with tannic acid yellow shades.

5. The polymethine dyestuff corresponding to the formula

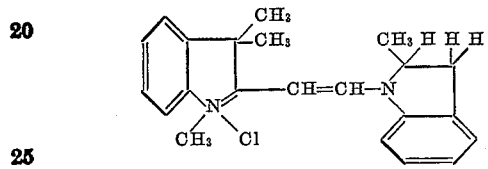

which is soluble in water, which forms in the dry state yellow crystals, and which dyes cotton mordanted with tannic acid clear yellow shades.

6. The polymethine dyestuff corresponding to the formula

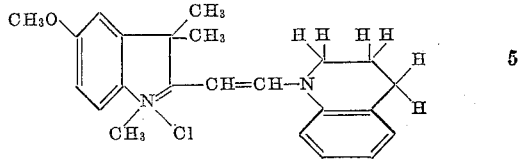

which is soluble in water, which forms in the dry state yellow crystals, and which dyes cotton mordanted with tannic acid clear yellow shades.

7. The polymethine dyestuff corresponding to the formula

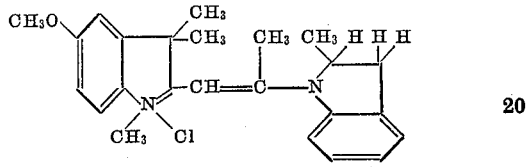

which is soluble in water, which forms in the dry state yellow crystals, and which dyes cotton mordanted with tannic acid clear yellow shades.

NIKOLAUS ROH.
PAUL WOLFF.
GUSTAV SCHÄFER.